(12) United States Patent
Toda

(10) Patent No.: US 8,284,443 B2
(45) Date of Patent: Oct. 9, 2012

(54) APPARATUS AND SYSTEM FOR MANAGING FORM DATA OBTAINED FROM OUTSIDE SYSTEM

(75) Inventor: Katsuyuki Toda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1040 days.

(21) Appl. No.: 11/683,130

(22) Filed: Mar. 7, 2007

(65) Prior Publication Data

US 2007/0273898 A1 Nov. 29, 2007

(30) Foreign Application Priority Data

Mar. 8, 2006 (JP) .................................. 2006-062188

(51) Int. Cl.
*H04N 1/00* (2006.01)
(52) U.S. Cl. ......................................................... 358/1.6
(58) Field of Classification Search .................. 358/1.1, 358/1.5, 1.6, 1.15
See application file for complete search history.

(56) References Cited

U.S. PATENT DOCUMENTS

| | | | | |
|---|---|---|---|---|
| 5,862,255 | A | * | 1/1999 | Davies et al. ................. 382/183 |
| 6,504,960 | B2 | | 1/2003 | Takahashi |
| 6,765,688 | B1 | * | 7/2004 | Claiborne .................... 358/1.18 |
| 2002/0080386 | A1 | * | 6/2002 | Snowdon et al. ............ 358/1.15 |
| 2002/0154336 | A1 | * | 10/2002 | Takei ............................ 358/1.15 |
| 2003/0085942 | A1 | | 5/2003 | Narusawa et al. |
| 2003/0090572 | A1 | | 5/2003 | Belz et al. |
| 2003/0093759 | A1 | | 5/2003 | Narusawa |
| 2006/0055961 | A1 | | 3/2006 | Toda |
| 2006/0170715 | A1 | | 8/2006 | Toda |
| 2006/0182480 | A1 | | 8/2006 | Toda |
| 2006/0192796 | A1 | | 8/2006 | Toda |
| 2006/0209316 | A1 | | 9/2006 | Toda |

FOREIGN PATENT DOCUMENTS

| | | |
|---|---|---|
| EP | 1 498 811 A1 | 1/2005 |
| JP | 11-8831 | 1/1999 |
| JP | 11-127323 | 5/1999 |
| JP | 2000-71575 | 3/2000 |
| JP | 2000-113176 | 4/2000 |
| JP | 2001-111809 | 4/2001 |
| JP | 2002-16833 | 1/2002 |
| JP | 2002-77573 | 3/2002 |
| JP | 2004-268550 | 9/2004 |
| JP | 2005-352752 | 12/2005 |
| WO | WO 2005/014294 A1 | 2/2005 |

OTHER PUBLICATIONS

Office Action issued Dec. 21, 2010 in Japan Application No. 2006-062188.
Office Action issued Jul. 26, 2011 in Japan Application No. 2006-062188.

* cited by examiner

*Primary Examiner* — Benny Q Tieu
*Assistant Examiner* — Jeremiah Bryar
(74) *Attorney, Agent, or Firm* — Oblon, Spivak, McClelland, Maier & Neustadt, L.L.P.

(57) ABSTRACT

Example embodiments of the present invention relate generally to an apparatus and system for managing form data obtained from an outside system, which may be combined with image data to be printed.

20 Claims, 13 Drawing Sheets

FIG. 5

```
<Capability>
<Quality=Normal, Fine>
<PaperSize=A4>
<Date=Off>
<Layout=A4/1 × 1, A4/Form1, A4/Form2, A4/Form3>
</Capability>
```

FIG. 6

| ID | FILE LOCATION | PAPER SIZE |
|---|---|---|
| 1 | ROM | A4 |
| 2 | ROM | A4 |
| 3 | ROM | A4 |

FIG. 7

```
<JOBSTART>
<Quality=Normal>
<PaperSize=A4>
<Date=Off>
<Layout=A4/1 × 1>
<Picture=00000001,00000002,00000003>
</JOBSTART>
```

FIG. 8

```
<JOBSTART>
<Quality=Normal>
<Date=Off>
<Picture=Form01,00000001,00000002>
</JOBSTART>
```

FIG. 9A

| |
|---|
| NUMBER OF IMAGES |
| IMAGE DATA #1 |
| IMAGE DATA #2 |
| . . . |
| IMAGE DATA #N |

FIG. 9B

| | |
|---|---|
| CHARACTER DEPICTING #1 (INDEX NUMBER: 0) | |
| CHARACTER DEPICTING #2 (INDEX NUMBER: 1) | CHARACTER DEPICTING ELEMENT |
| . . . | |
| CHARACTER DEPICTING #N (INDEX NUMBER: N) | |
| LINE DEPICTING #1 (INDEX NUMBER: 1) | |
| LINE DEPICTING #2 (INDEX NUMBER: 2) | LINE DEPICTING ELEMENT |
| . . . | |
| LINE DEPICTING #N (INDEX NUMBER: N) | |
| GRAPHIC DEPICTING #1 (INDEX NUMBER: 1) | |
| GRAPHIC DEPICTING #2 (INDEX NUMBER: 2) | GRAPHIC DEPICTING ELEMENT |
| . . . | |
| GRAPHIC DEPICTING #N (INDEX NUMBER: N) | |
| IMAGE DEPICTING #1 (INDEX NUMBER: 1) | |
| IMAGE DEPICTING #2 (INDEX NUMBER: 2) | IMAGE DEPICTING ELEMENT |
| . . . | |
| IMAGE DEPICTING #N (INDEX NUMBER: N) | |

FIG. 9C

| ID |
|---|
| NAME |
| PAPER SIZE |
| LINE DEPICTING #1 #2 #3 |
| IMAGE DATA #1 |
| CHARACTER DEPICTING #1 |
| IMAGE DEPICTING #0 |
| IMAGE DATA #2 |
| CHARACTER DEPICTING #2 |
| IMAGE DATA #3 |
| CHARACTER DEPICTING #3 |

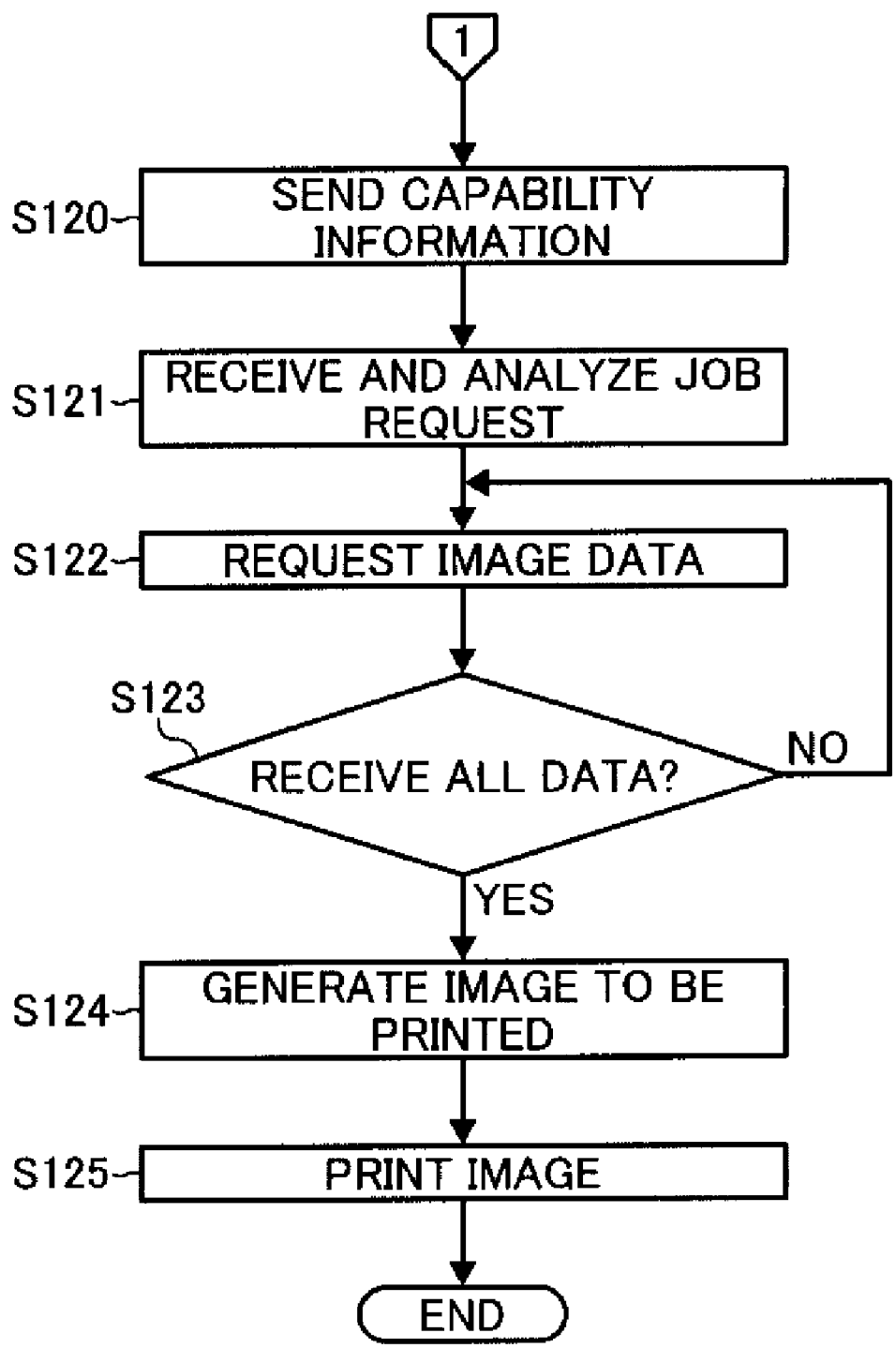

FIG. 12

```
<Capability>
<Quality=Normal, Fine>
<PaperSize=A4>
<Date=Off>
<Layout=A4/1 × 1, A4/Form1, A4/Form2, A4/Form3, A4/Form4>
</Capability>
```

FIG. 13

| ID | FILE LOCATION | PAPER SIZE |
|---|---|---|
| 1 | ROM | A4 |
| 2 | ROM | A4 |
| 3 | ROM | A4 |
| 4 | MC | A4 |

FIG. 14

```
<Capability>
<Quality=Normal, Fine>
<PaperSize=A4>
<Date=Off>
<Layout=A4/1 × 1, B5/Form1, A4/Form2, A4/Form3, A4/Form4>
</Capability>
```

FIG. 15

| ID | FILE LOCATION | PAPER SIZE |
|---|---|---|
| 1 | MC | B5 |
| 2 | ROM | A4 |
| 3 | ROM | A4 |
| 4 | MC | A4 |

APPARATUS AND SYSTEM FOR MANAGING FORM DATA OBTAINED FROM OUTSIDE SYSTEM

CROSS-REFERENCE TO RELATED APPLICATIONS

This patent application is based on and claims priority under 35 U.S.C. §119 to Japanese patent application No. 2006-62188 filed on Mar. 8, 2006, in the Japanese Patent Office, the entire contents of which are hereby incorporated by reference.

FIELD OF THE INVENTION

Example embodiments of the present invention relate generally to an apparatus and system for managing form data obtained from an outside system, which may be combined with image data to be printed.

DESCRIPTION OF THE RELATED ART

In order to print out image data captured by a photographing device, the photographing device may be directly connected to a printer to create a direct printing system. Upon receiving a request for printing the image data through the photographing device, the printer may print the image data sent from the photographing device. In this manner, the image data stored in the photographing device may be printed out by the printer without requiring any additional device.

While the above-described direct printing system increases user operability, the user may be discouraged from applying various image processing to the image data before printing. For example, the printer or the photographing device is usually provided with a limited number of form data, which specifies the layout of the image data when the image data is printed on a recording sheet, due to the memory space of the printer or the photographing device. Further, the user is usually discouraged from changing the contents of form data or adding newly created form data to the printer since modifying the form data requires much work and time. Accordingly, an additional device, such as an image processor, is usually introduced to the printing system when the user prefers to change or add the form data, for example, as described in the Japanese Patent Application No. 2000-71575 or 2002-16833.

SUMMARY

Example embodiments of the present invention relate generally to an apparatus and system for managing form data obtained from an outside system, which may be combined with image data to be printed.

In one example, an image forming system is provided, which includes an image forming apparatus and a portable device that are connected with each other via a communication interface. The image forming apparatus includes a first form data memory storing previously stored form data; a first interface accessible to a second form data memory provided outside of the first form data memory; and a first controller storing layout capability information generated using information obtained from the previously stored form data. The portable device includes a user interface; a second interface accessible to a third form data memory provided outside of the first form data memory and the second form data memory; and a second controller.

At predetermined timing, the first controller may determine whether first additional form data is stored in the second form data memory. When the first additional form data is stored in the second form data memory, the first controller updates the layout capability information using information obtained from the first additional form data. In response to a request for capability information received from the portable device, the first controller may send capability information including the first updated layout capability information to the portable device.

Upon receiving the capability information including the first updated layout capability information, the portable device may display the first updated layout capability information to a user through the user interface.

Alternatively, upon receiving the capability information including the first updated layout capability information, the second controller of the portable device may determine whether second additional form data is stored in the third form data memory. When the second additional form data is stored in the third form data memory, the second controller may update the first updated layout capability information using information obtained from the second additional form data to generate second updated layout capability information. The second updated layout capability information may be displayed to the user through the user interface.

In addition to the above-described examples, the present invention may be practiced in various other ways.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 illustrates the items of capability information according to an example embodiment of the present invention;

FIG. 6 is an example form management table storing the items of layout capability information;

FIG. 7 illustrates the items of information included in a job request sent by the digital camera shown in FIG. 1 to the printer shown in FIG. 1, according to an example embodiment of the present invention;

FIG. 8 illustrates the items of information included in a job request sent by the digital camera shown in FIG. 1 to the printer shown in FIG. 1, according to an example embodiment of the present invention;

FIG. 9A illustrates the items of layout information of form data, according to an example embodiment of the present invention;

FIG. 9B illustrates the items of depicting information of form data, according to an example embodiment of the present invention;

FIG. 9C illustrates the items of form data, according to an example embodiment of the present invention;

FIG. 12 illustrates the items of capability information according to an example embodiment of the present invention;

FIG. 13 is an example form management table storing the items of layout capability information;

FIG. 14 illustrates the items of capability information according to an example embodiment of the present invention;

FIG. 15 is an example form management table storing the items of layout capability information;

DETAILED DESCRIPTION OF THE INVENTION

Figure 1:
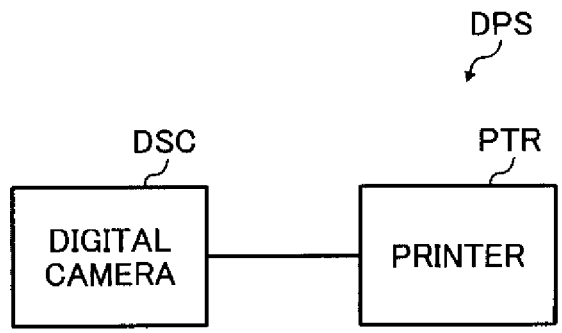
FIG. 1 is a schematic block diagram illustrating the structure of a printing system including a digital camera and a printer, according to an example embodiment of the present invention.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. For example, the singular forms "a", "an" and "the" are intended to include the plural forms as well, unless the context clearly indicates otherwise.

Referring now to the drawings, wherein like reference numerals designate identical or corresponding parts throughout the several views, FIG. 1 illustrates a printing system DPS according to an example embodiment of the present invention. The printing system DPS includes a printer PTR and a digital still camera ("digital camera") DSC.

Figure 2:
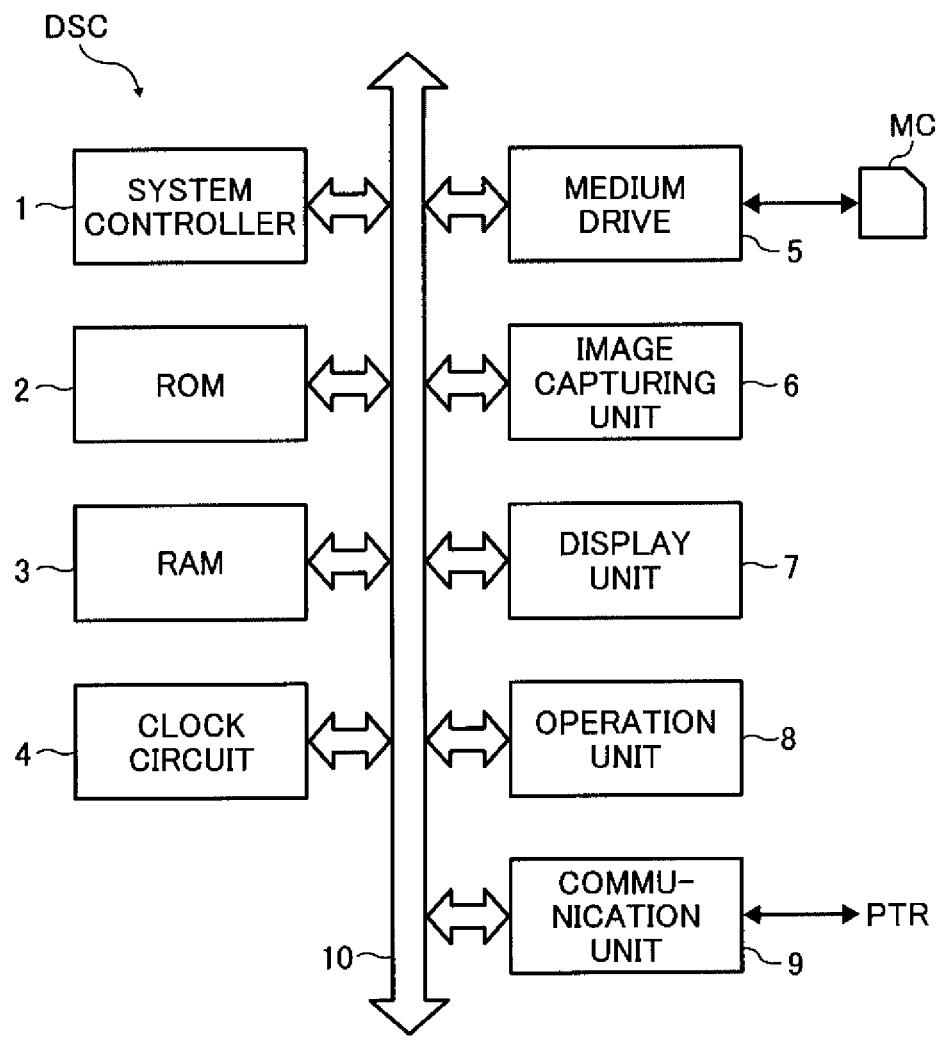
FIG. 2 is a schematic block diagram illustrating a hardware structure of the digital camera shown in FIG. 1, according to an example embodiment of the present invention.

Referring now to FIG. 2, an example hardware structure of the digital camera DSC is explained. The digital camera DSC includes a system controller 1, a read only memory (ROM) 2, a random access memory (RAM) 3, a clock circuit 4, a medium drive 5, an image capturing unit 6, a display unit 7, an operation unit 8, and a communication unit 9, which are connected via an internal bus 10.

The system controller 1, which may be implemented by a processor, controls operation of the digital camera DSC including, for example, reading data from or writing data onto a removable medium such as a memory card MC, capturing image data, communicating with an external device such as the printer PTR, processing data to be displayed to a user, etc. The ROM 2 stores various data, for example, various control programs to be executed by the system controller 1, and/or one or more form data files. The RAM 3 may function as a work area of the system controller 1, or store various parameters to be used by the digital camera DSC. The clock circuit 4 outputs time information, such as information regarding the current time. The medium drive 5 reads data from or write data onto the removable medium, such as the memory card MC. In this example, the memory card MC may include an image data area capable of storing image data captured by the image capturing unit 6, and/or a form data area capable of storing one or more form data files. The image capturing unit 6 captures image data of an object using an optical system and a photoelectric converting unit, and stores the image data in a memory such as the memory card MC. The display unit 7, which may be implemented by a liquid crystal display (LCD), displays various data to the user including, for example, information regarding one or more form data files accessible by the digital camera DSC. The operation unit 8, which may be implemented by various keys or buttons, allows the user to input an instruction to the digital camera DSC, or to the printer PTR through the digital camera DSC. The communication unit 9, which may be implemented by a universal serial bus (USB) device, allows communication between the digital camera DSC and an external device such as the printer PTR. The communication unit 9 may be additionally connected to an image storage device optionally provided in the printing system DPS.

Figure 3:
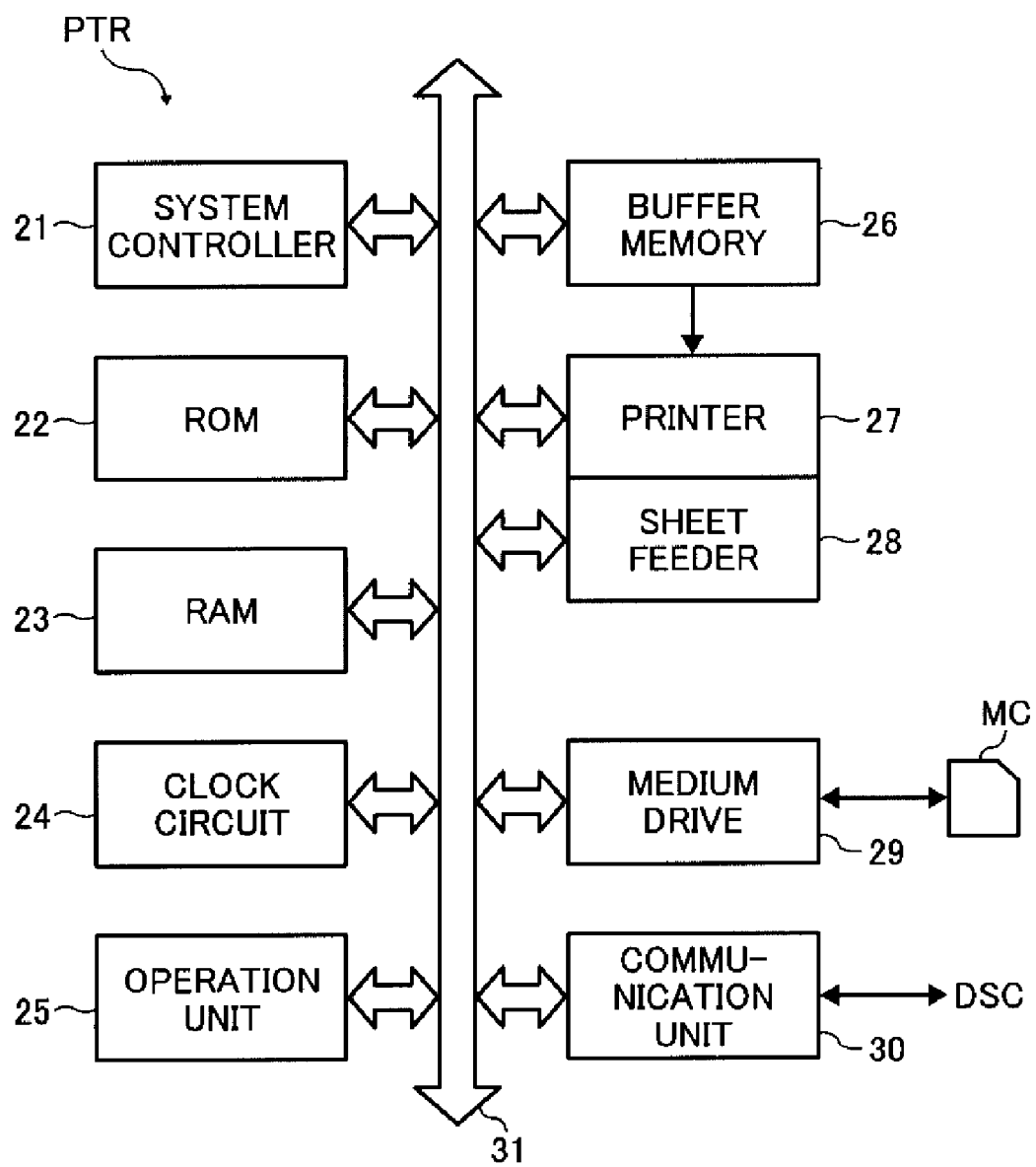
FIG. 3 is a schematic block diagram illustrating a hardware structure of the printer shown in FIG. 1, according to an example embodiment of the present invention.

Referring now to FIG. 3, an example hardware structure of the printer PTR is explained. The printer PTR includes a system controller 21, a ROM 22, a RAM 23, a clock circuit 24, an operation unit 25, a buffer memory 26, a printer 27, a sheet feeder 28, a medium drive 29, and a communication unit 30, which are connected via an internal bus 31.

The system controller 21, which may be implemented by a processor, controls operation of the printer PTR including, for example, feeding a recording sheet, printing image data that may be combined with form data, communicating with an external device such as the digital camera DSC, processing data to be displayed to the user, etc. The ROM 22 stores various data, for example, various control programs to be executed by the system controller 21, and/or one or more form data files. The RAM 23 may function as a work area of the system controller 21, or store various parameters to be used by the printer PTR. The clock circuit 24 outputs time information, such as information regarding the current time. The operation unit 25 may function as a user interface, such as an operation panel, which allows the user to input an instruction to the printer PTR. The buffer memory 26 may function as a frame memory storing one page of image data to be printed. The printer 27 reads the image data from the buffer memory 26, and prints the image data on a recording sheet fed by the sheet feeder 28. The sheet feeder 28 may be implemented by one or more feed cassettes, each of which is capable of storing paper of various standard sizes including the A4 size, B5 size, A3 size, etc. The medium drive 29 reads data from or writes data onto a removable medium, such as a memory card MC. In this example, the memory card MC may include an image data area capable of storing image data, and/or a form data area capable of storing one or more form data files. The communication unit 30 may be implemented by a USB device, which connects the printer PTR with an external device such as the digital camera DSC. The communication unit 30 may be additionally connected to an image storage device optionally provided in the printing system DPS.

As shown in FIG. 1, the digital camera DSC and the printer PTR may be directly connected with each other via a communication interface, such as a USB cable. When the digital camera DSC and the printer PTR are directly connected, in one example as illustrated in FIG. 4, the printer PTR may print image data sent from the digital camera DSC according to a user instruction input through the digital camera USC.

Figure 4:
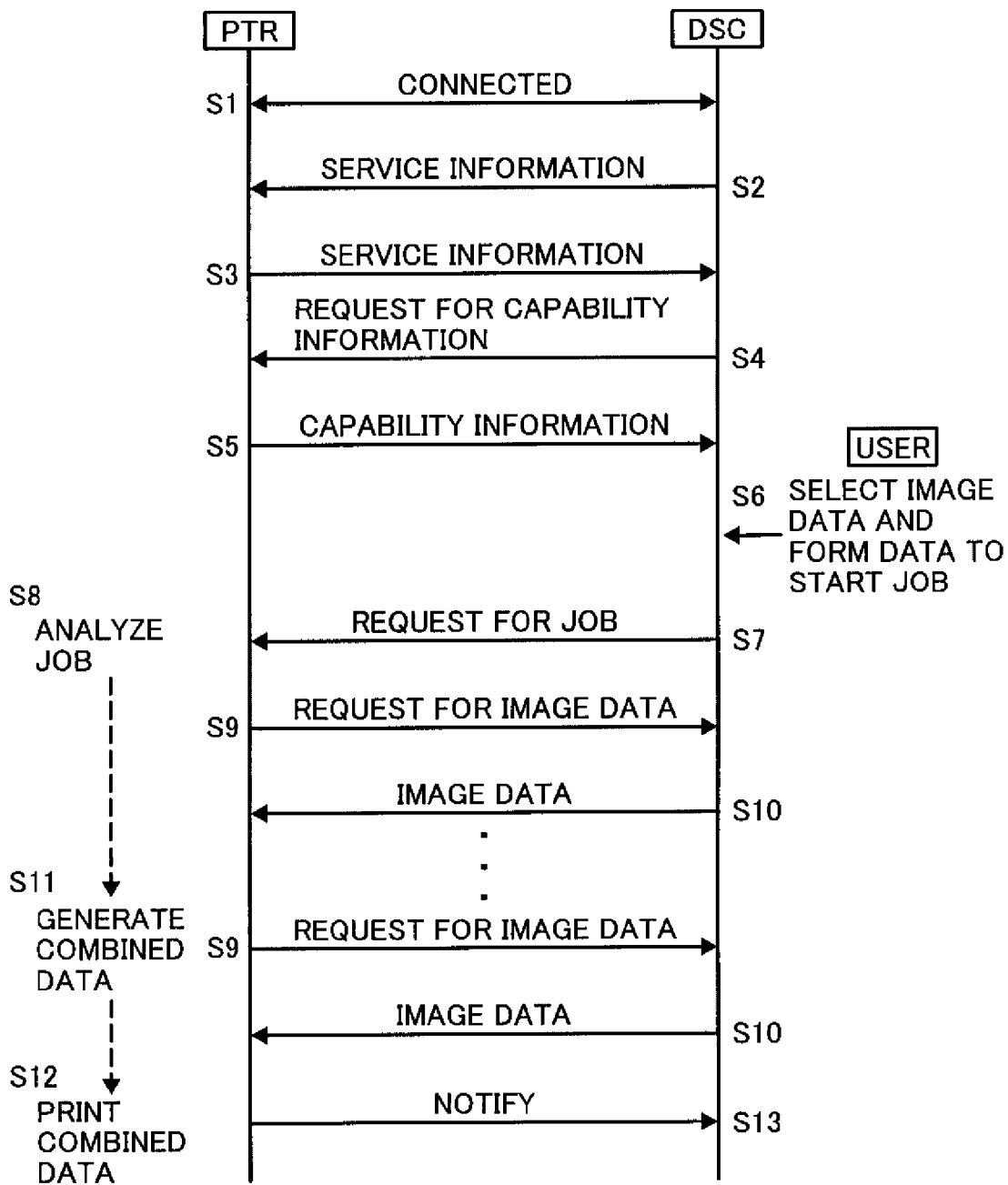
FIG. 4 is a timing chart illustrating communication between the digital camera shown in FIG. 1 and the printer shown in FIG. 1, according to an example embodiment of the present invention.

Referring to FIG. 4, at S1, the printer PTR and the digital camera DSC are directly connected.

At S2 and S3, service information is exchanged between the digital camera DSC and the printer PTR. In this example, at S2, the digital camera DSC notifies the printer PTR that the digital camera DSC provides the print client function and the storage server function. At S3, the printer PTR notifies the digital camera DSC that the printer PTR provides the print server function and the storage client function. After exchanging the service information, the connection between the digital camera DSC and the printer PTR is established to start a communication session.

At S4, the digital camera DSC requests the printer PTR for capability information. In response, at S5, the printer PTR sends the capability information to the digital camera DSC.

In this example, as illustrated in FIG. 5, the capability information may describe one or more print options available to the user, including, for example, the printing quality option indicating whether to print image data with a normal quality or a fine quality, paper size option indicating one or more paper sizes available for use when printing image data, date option indicating whether to print date information together with image data, and/or layout option indicating one or more form data files available for use when printing image data. For the descriptive purpose, the capability information relating to the layout option may be referred to as the layout capability information.

The capability information may be further updated before it is sent to the digital camera DSC. For example, the layout capability may be updated based on whether one or more additional form data files are available in addition to previously stored form data files, which are previously stored by default in the ROM 22 of the printer PTR. In this example, the additional form data files may be stored in any desired memory accessible from the printer PTR, for example, the memory card MC of the printer PTR. The additional form data files, which are different from the previously stored data files, may be created by the user according to the user preference. Alternatively, one or more additional form data files may be stored in any desired memory other than the memory card MC, including an optical disc, a hard disc drive, etc., as long as the memory is accessible by the printer PTR.

Further, the capability information, which may be updated, may be edited in a form displayable to the user, and displayed to the user through the display unit 7 of the digital camera DSC. For example, as illustrated in FIG. 6, the layout capability information may be displayed as a form management table. Referring to FIG. 6, the form management table stores information relating to one or more form data files available for use when printing image data, including, for example, identification information of each form data file, location information indicating the location at which each form data file is stored, and paper size information indicating the paper size applicable to each form data file.

At S6, the digital camera DSC requests the user to select image data to be printed. In this example, the digital camera DSC may store one or more image data files, which may be captured using the image capturing unit 6 (FIG. 2). The digital camera DSC may display a list of image data files available to the user for output, and request the user to select at least one of the image data files.

Further, at S6, the digital camera DSC may request the user to select one or more print options from the capability information being displayed on the display unit 7. For example, the digital camera DSC may display the form management table shown in FIG. 6, which lists one or more form data files available to the user for output, and request the user to select at least one of the form data files. After making the selection, the user may instruct the digital camera DSC to request for a print job.

Further, in this example, before displaying the form management table generated based on the layout capability information received from the printer PTR, the digital camera DSC may determine whether one or more additional form data files are stored in any desired memory accessible from the digital camera DSC, for example, the memory card MC of the digital camera DSC. When one or more additional form data files are stored, the digital camera DSC may update the layout capability information received from the printer PTR, using information obtained from the additional form data files stored in the MC of the digital camera DSC. The additional form data files, which are different from the previously stored data files, may be created by the user according to the user preference. Alternatively, one or more additional form data files may be stored in any desired memory other than the memory card MC, including an optical disc, a hard disc drive, etc., as long as the memory is accessible by the digital camera DSC.

At S7, the digital camera DSC sends a request for starting the print job to the printer PTR. For example, the request for starting the print job may include information regarding the image data to be printed and the print options to be used when printing the image data, for example, as illustrated in FIG. 7 or 8. Referring to FIG. 7, three image data files are selected for printing. The printing quality option indicates to use the normal quality. The paper size option selects the A4 paper size. The date option indicates not to print date information. The layout option indicates to print the image data files without using any form data file. Referring to FIG. 8, two image data files are selected for printing. The printing quality option indicates to use the normal quality. The date option indicates not to print date information. The layout option indicates to print the image data using form data "Form 1".

Further, at S7, the digital camera DSC may send the additional form data file to be used, when the form data file stored in the MC inserted in the medium drive 5 of the digital camera DSC is selected at S6.

At S8, the printer PTR analyzes the print job.

At S9, based on the analysis, the printer PTR requests the digital camera DSC for image data to be printed. In response, at S10, the digital camera DSC sends the image data requested by the printer PTR. S9 and S10 are repeated until the printer PTR receives all necessary data.

At S11, the printer PTR extracts one or more print options from the print job, which are selected at S6, and edits the image data according to the selected options. For example, when the form data is selected at S6, the printer PTR combines the selected image data with the selected form data to generate combined image data.

In one example, the form data may include layout information and depicting information. The layout information indicates how one or more image data files are laid on a printed image. For example, as illustrated in FIG. 9A, the layout information may include information regarding the number of image data files to be included in the printed image ("NUMBER OF IMAGES"), and the order in which the image data files are laid out in the printed image by assigning an index number #1 to #N to each one of the image data files to be included. Further, the layout information may indicate the position of each one of the image data files. In this example, the index number #1 to #N is used to determine the order in which the image data files are laid out in the printed image.

The depicting information describes one or more depicting elements to be added to the printed image, and the order in which the depicting elements are laid out in the printed image. For example, as illustrated in FIG. 9B, the depicting elements may be classified into a character depicting element, a line depicting element, a graphic depicting element, and an image depicting element. The character depicting element includes information regarding a character string to be added, including a position, size, font, style, color, etc. of the character string. The line depicting element includes information regarding a line to be added, including a position, length, line intervals, thickness, color, type, etc. of the line. The graphic depicting element includes information regarding a graphic image to be added, including a position, type, drawing method, color, etc. of the graphic image. The image depicting element includes information regarding an image to be added, including a position, size, color, type, etc., of the image. In this example, the image to be added may be a logo image or a stamp image. Further, as illustrated in FIG. 9B, each depicting element is assigned with an index number #1 to #N, which corresponds to the index number assigned to each image data file. In this example, the index number #1 to #N is used to determine the order in which the depicting elements are laid out in the printed image.

Further, the depicting elements are laid out in a corresponding manner with the image data files using the index number. For example, the depicting element assigned with the index number #1 is laid out at a position determined by the position of the image data file assigned with the index number #1. Alternatively, the depicting element assigned with the index number 0 is not associated with any image data file that the depicting element is laid out at the fixed position.

In another example, as illustrated in FIG. 9C, the form data may include identification information regarding the form data file ("ID"), name information assigned to the form data file ("NAME"), and paper size information regarding the paper size to be used ("PAPER SIZE"), in addition to the image data files and the depicting elements descried above referring to FIG. 9B.

Figure 10:
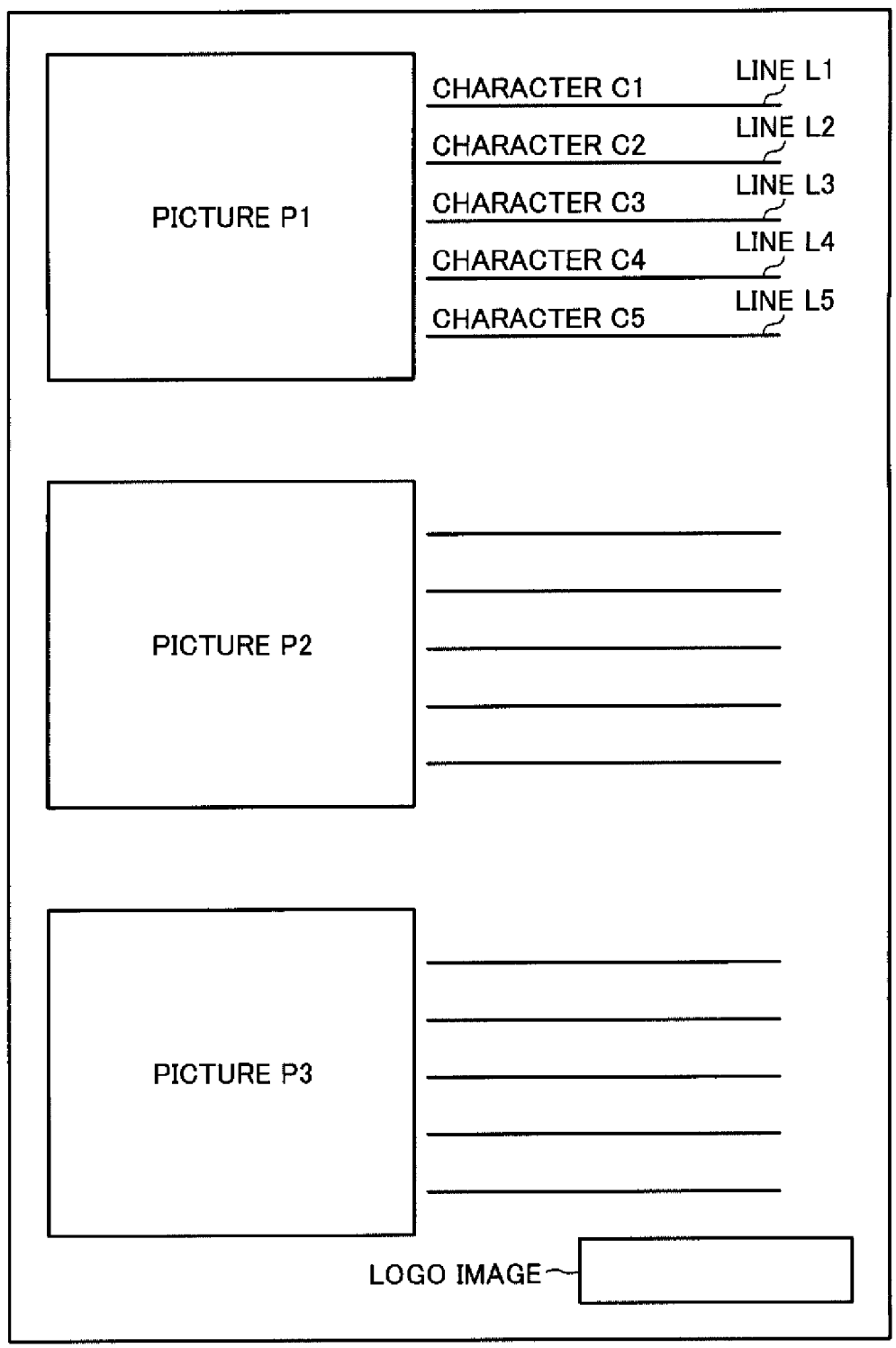
FIG. 10 illustrates an example combined image generated by combining image data with form data, according to an example embodiment of the present invention.

FIG. 10 illustrates an example combined image, which may be generated by combining image data files P1, P2, and P3 with the form data shown in FIG. 9C. In this example, the printer PTR draws five rule lines L1 to L5 for each one of the pictures P1, P2, and P3 according to the line depicting element. The printer PTR adds the picture P1 using the image data file obtained from the digital camera DSC according to the layout information, and further adds the five characters C1 to C5 according to the character depicting element. The printer PTR then adds the logo image according to the image depicting element. The printer PTR adds the picture P2 using the image data file obtained from the digital camera DSC according to the layout information, and further adds the five characters C1 to C5 according to the character depicting element. The printer PTR adds the picture P3 using the image data file obtained from the digital camera DSC according to the layout information, and further adds the five characters C1 to C5 according to the character depicting element. The combined image may be displayed by the digital camera DSC or printed by the printer PTR.

Further, in this example, when the number of selected image data files extracted from the job request is less than the number of image data files specified by the format data, the printer PTR may determine not to add the rule lines or characters. For example, referring to FIG. 10, when two image data files P1 and P2 are selected for printing, the rule lines L1 to L5 and the characters C1 to C5 are not printed for the picture P3.

Referring back to FIG. 4, at S12, the printer PTR prints the combined image data using the printer 27.

At S13, the printer PTR notifies the digital camera DSC that the print job is completed.

In this example, the printer PTR or the digital camera DSC may operate differently depending on whether one or more additional form data files are available to the user in addition to the previously stored form data files previously stored in the printer PTR. The additional form data may be stored in a memory provided outside of the system, as long as it is readable by at least one of the printer PTR and the digital camera DSC. In one example, the additional form data may be stored in a removable medium readable by the printer PTR, such as the memory card MC of FIG. 3. In another example, the additional form data may be stored in a removable medium readable by the digital camera DSC, such as the memory card MC of FIG. 1. In another example, the additional form data may be stored in a storage device readable from either one of the printer PTR and the digital camera DSC, such as an image storage device that may be provided in the printing system DPS of FIG. 1. In another example, the additional form data may be stored in a memory of the digital camera DSC, such as the ROM 2 of the digital camera DSC shown in FIG. 2. In another example, the additional form data may be stored in a memory of the printer PTR other than the ROM 22, which may be optionally provided.

Figure 11A:
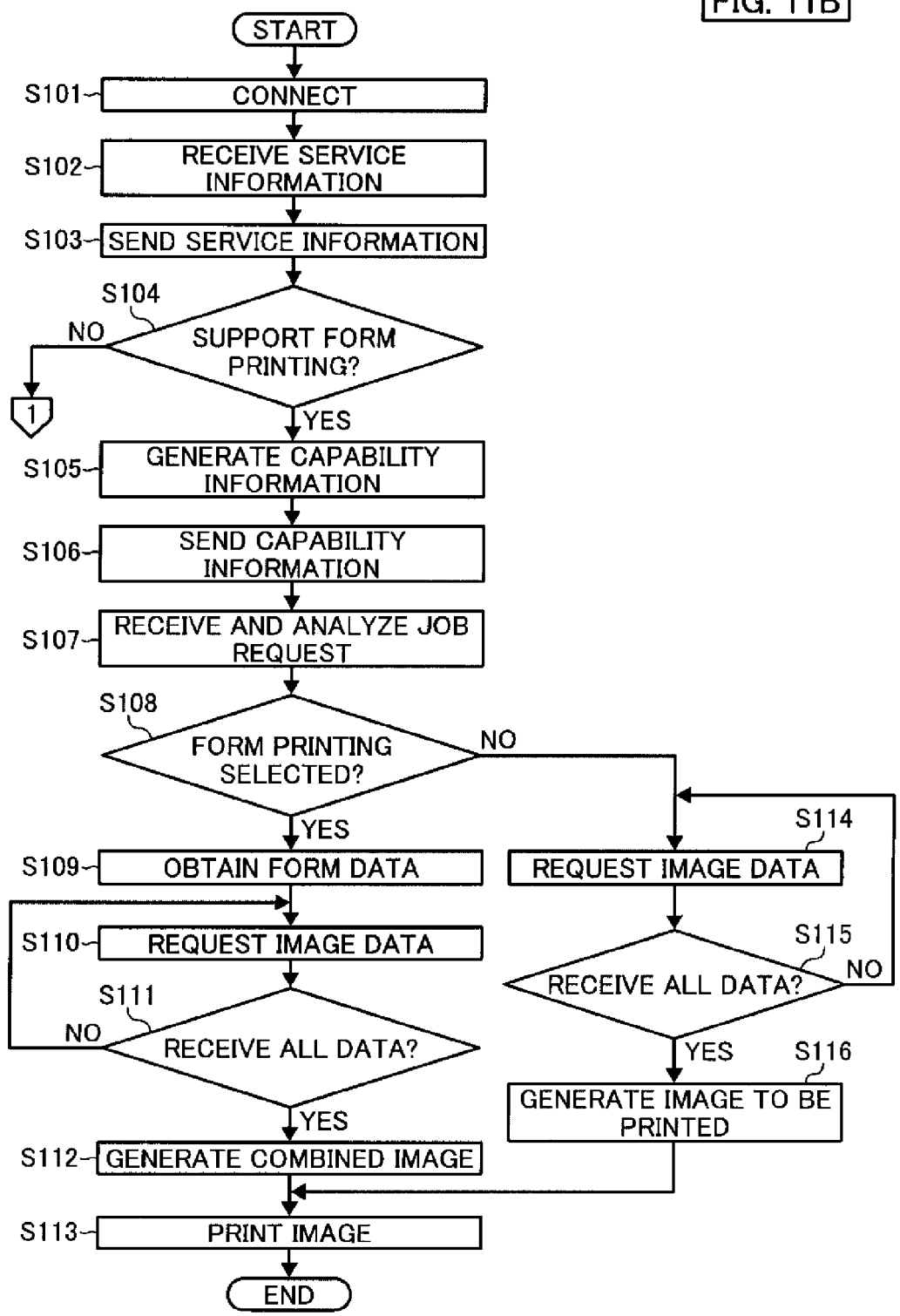
FIG. 11 is a flowchart illustrating operation of printing image data combined with form data, performed by the printer shown in FIG. 1, according to an example embodiment of the present invention.

Referring now to FIGS. 11A and 11B, operation of printing image data combined with form data, performed by the printer PTR shown in FIG. 1, is explained according to an example embodiment of the present invention. The operation of FIGS. 11A and 11B may be performed by the system controller 21 when the corresponding program is loaded from the ROM22 onto the RAM 23.

At S101, the digital camera DSC and the printer PTR are connected with each other via the USB cable. At S102, the printer PTR receives service information from the digital camera DSC. At S103, the printer PTR sends service information to the digital camera DSC.

S104 determines whether the digital camera DSC supports form printing. In this example, form printing corresponds to printing image data using form data. If it is determined that the digital camera DSC supports form printing ("YES" at S104), the operation proceeds to S105. Otherwise ("NO" at S104), the operation proceeds to S120.

S105 generates capability information, which includes layout capability information regarding one or more form data files available to the user. In this example, it is assumed that the ROM 22 of the printer PTR stores previously stored one or more data files including the "Form 1" file, the "Form 2" file and the "Form 3" file, as illustrated in FIG. 5. The layout capability information may be managed as the form management table shown in FIG. 6.

Further, at S105, the printer PTR may determine whether to add one or more additional form data files by checking the memory card MC of the printer PTR. In one example, when the memory card MC of FIG. 3 is not inserted into the medium drive 29 of the printer PTR or when no additional form data file is stored in the memory card MC, the layout capability information indicates that the "Form 1" file, the "Form 2" file and the "Form 3" file are available as illustrated in FIG. 5 or 6. In another example, when the memory card MC of FIG. 3 is inserted into the medium drive 29 of the printer PTR and when the memory card MC has an additional data file named "Form 4", the layout capability information indicates that the "Form 1" file, the "Form 2" file, the "Form 3" file, and the "Form 4" file are available as illustrated in FIG. 12 or 13.

Further, at S105, the printer PTR may determine whether to overwrite one or more previously stored form data files with one or more additional form data files by checking the memory card MC of the printer PTR. For example, when the memory card MC stores the additional form data file "Form 1", which has information different from the previously stored form data file "Form 1", the layout capability information of FIG. 12 may be updated to the layout capability information shown in FIG. 14. Similarly, the layout capability information of FIG. 13 may be updated to the layout capability information shown in FIG. 15.

Referring back to FIG. 11, S106 sends the capability information to the digital camera DSC, which includes the updated layout capability information.

S107 receives a job request from the digital camera DSC. At this time, the printer PTR may receive the additional form data file, which may be read by the medium drive 5 from the memory card MC, when the user selects the additional form data file stored in the memory card MC of FIG. 2.

S108 determines whether form printing is selected. If it is determined that form printing is selected ("YES" at S108), the operation proceeds to S109. Otherwise ("NO" at S108), the operation proceeds to S1114.

When form printing is selected, S109 obtains the form data file specified by the job request. S110 requests for one or more image data files, which are specified by the job request. S111 determines whether all image data files are received. When it is determined that all image data files are received ("YES" at S111), the operation proceeds to S112. Otherwise ("NO" at S111), the operation repeats S110. S112 combines the image data with the form data to generate combined image data. S113 prints the combined image data, and the operation ends.

When form printing is not selected, S114 requests for one or more image data files, which are specified by the job request. S115 determines whether all image data files are received. When it is determined that all image data files are received ("YES" at S115), the operation proceeds to S116. Otherwise ("NO" at S115), the operation repeats S115. S116 generates image data to be printed. S113 prints the image data, and the operation ends.

When it is determined that the digital camera DSC does not support form printing at S104 ("NO" at S104), at S120, the printer PTR sends capability information to the digital camera DSC. S121 receives a job request from the digital camera DSC, and analyzes the job request. S122 requests one or more image data files, which are specified by the job request. S123 determines whether all image data files are received. If it is determined that all image data files are received ("YES" at S123), the operation proceeds to S124. Otherwise ("NO" at S123), the operation repeats S123. S124 generates image data to be printed. S125 prints the image data, and the operation ends.

The operation of FIGS. 11A and 11B may be performed in various other ways. For example, updating capability information may be performed at any desired time, including, for example, predetermined time set by the user, time at which the connection is established, or time at which the memory card MC is detected.

Figure 16A:
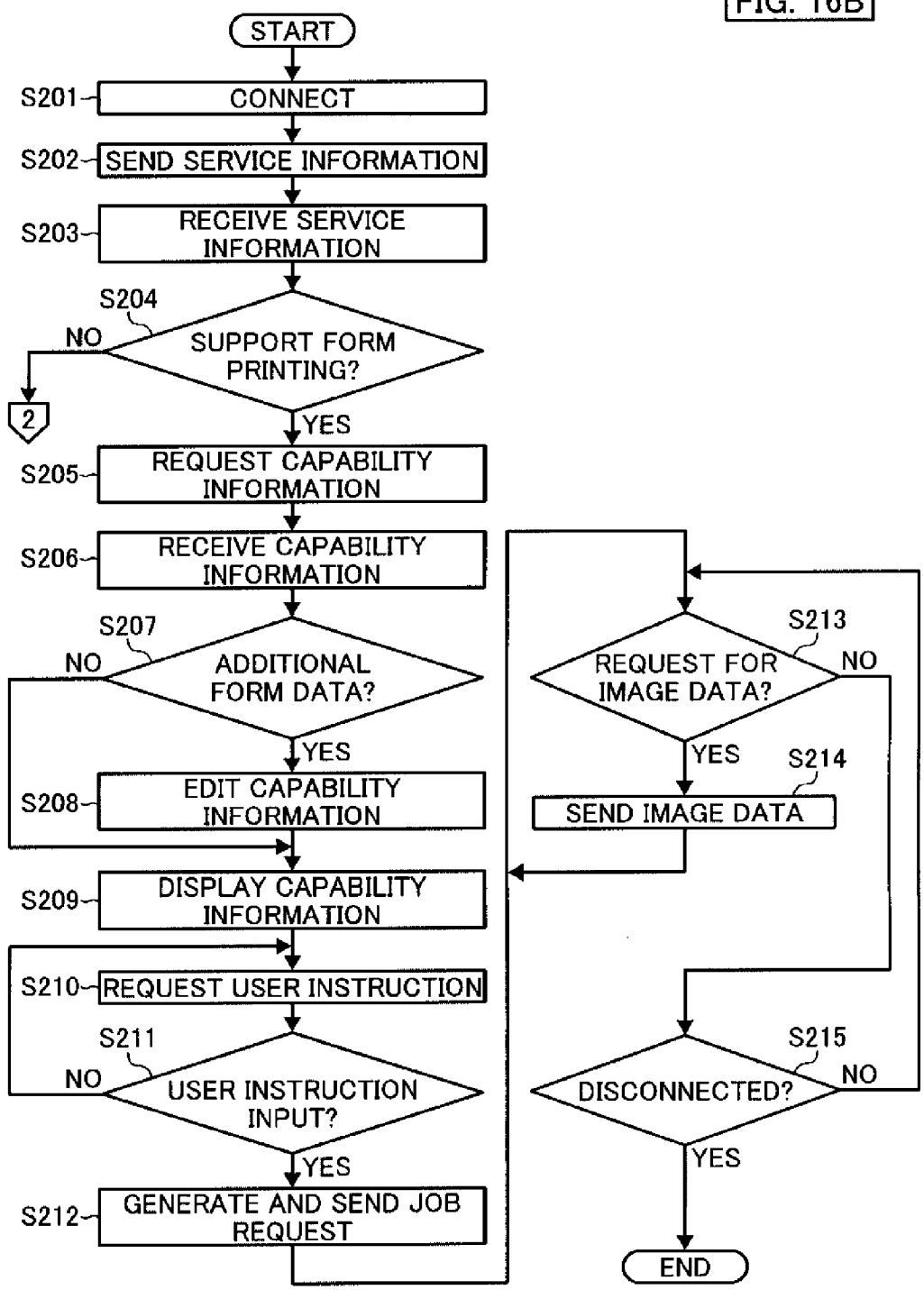
FIG. 16 is a flowchart illustrating operation of printing image data combined with form data, performed by the digital camera shown in FIG. 1, according to an example embodiment of the present invention.
Figure 16B:
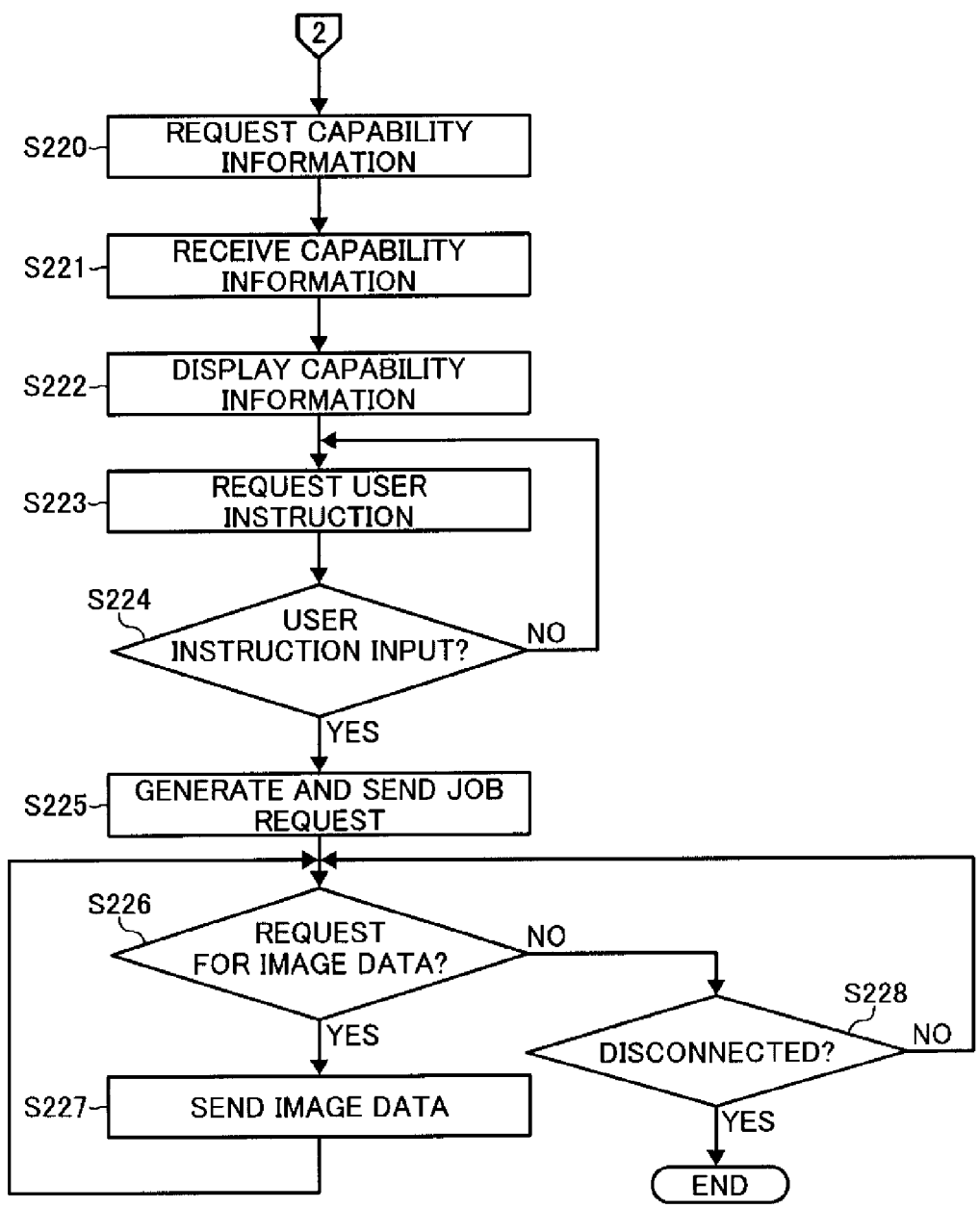

Referring now to FIGS. 16A and 16B, operation of printing image data combined with form data, performed by the digital camera DSC shown in FIG. 1, is explained according to an example embodiment of the present invention. The operation of FIGS. 16A and 16B may be performed by the system controller 1 when the corresponding program is loaded from the ROM 2 onto the RAM 3.

At S201, the digital camera DSC and the printer PTR are connected with each other via the USB cable. At S202, the digital camera DSC receives service information from the printer PTR. At S203, the digital camera DSC sends service information to the printer PTR.

S204 determines whether the printer PTR supports form printing. If it is determined that the printer PTR supports form printing ("YES" at S204), the operation proceeds to S205. Otherwise ("NO" at S204), the operation proceeds to S220.

S205 requests the printer PTR for capability information, which includes layout capability information regarding one or more form data files available to the user.

In this example, it is assumed that the ROM 22 of the printer PTR stores one or more previously stored data files including the "Form 1" file, the "Form 2" file and the "Form 3" file, as illustrated in FIG. 5 or 6.

S206 receives the capability information from the printer PTR, which includes the updated layout capability information.

S207 determines whether to add one or more additional form data files by checking the memory card MC of the digital camera DSC. When it is determined that additional form data file needs to be added ("YES" at S207), the operation proceeds to S208 to update the capability information received from the printer PTR. Otherwise ("NO" at S207), the operation proceeds to S209.

For example, when the memory card MC of FIG. 2 is not inserted into the medium drive 5 of the digital camera DSC or when no additional form data file is stored in the memory card MC, the layout capability information indicates that the "Form 1" file, the "Form 2" file and the "Form 3" file are available as illustrated in FIG. 5 or 6.

In another example, when the memory card MC of FIG. 2 is inserted into the medium drive 5 of the digital camera DSC and when the memory card MC has an additional data file named "Form 4", the layout capability information is updated to indicate that the "Form 1" file, the "Form 2" file, the "Form 3" file, and the "Form 4" file are available as illustrated in FIG. 12 or 13.

In another example, the digital camera DSC may determine whether to overwrite one or more previously stored data files with one or more additional form data files. For example, when the memory card MC stores the additional form data file "Form 1", which has information different from the previously stored form data file "Form 1", the layout capability information of FIG. 11 may be updated to the layout capability information shown in FIG. 12.

S209 displays the capability information to the user through the displaying unit 7. For example, the layout capability information may be displayed in the form management table shown in any one of FIGS. 6, 13, and 15.

S210 requests the user to input a user instruction through the operation unit 8. At this time, the user may select at least one of the format data files displayed by the display unit 7, for example, by inputting the ID of the selected format data file.

S211 determines whether the user instruction is input. When the user instruction is input ("YES" at S211), the operation proceeds to S212. Otherwise ("NO" at S211), the operation returns to S210.

S212 generates a job request, which includes information regarding the image data to be printed and/or the form data selected by the user.

S213 determines whether a request for the image data file is received from the printer PTR. When it is determined that the request is received ("YES" at S213), the operation proceeds to S214 to send the image data file to the printer PTR. Otherwise ("NO" at S213), the operation proceeds to S215. Alternatively, at S213, the digital camera DSC may determine whether all data is sent to the printer PTR. When it is determined that all data is sent ("YES" at S213), the operation proceeds to S214 to send the image data file to the printer PTR. Otherwise ("NO" at S213), the operation proceeds to S215.

S215 determines whether the printer PTR and the digital camera DSC are disconnected from each other. When the printer PTR and the digital camera DSC are disconnected ("YES" at S215), the operation ends. Otherwise ("NO" at S215), the operation returns to S213.

When it is determined that the digital camera DSC does not support form printing at S204 ("NO" at S204), at S220, the digital camera DSC requests the printer PTR for capability information. S221 receives the capability information from the printer PTR, and proceeds to S222 to S228 in a substantially similar manner as described above referring to S209 to S215.

The operation of FIGS. 16A and 16B may be performed in various ways.

Figure 17:
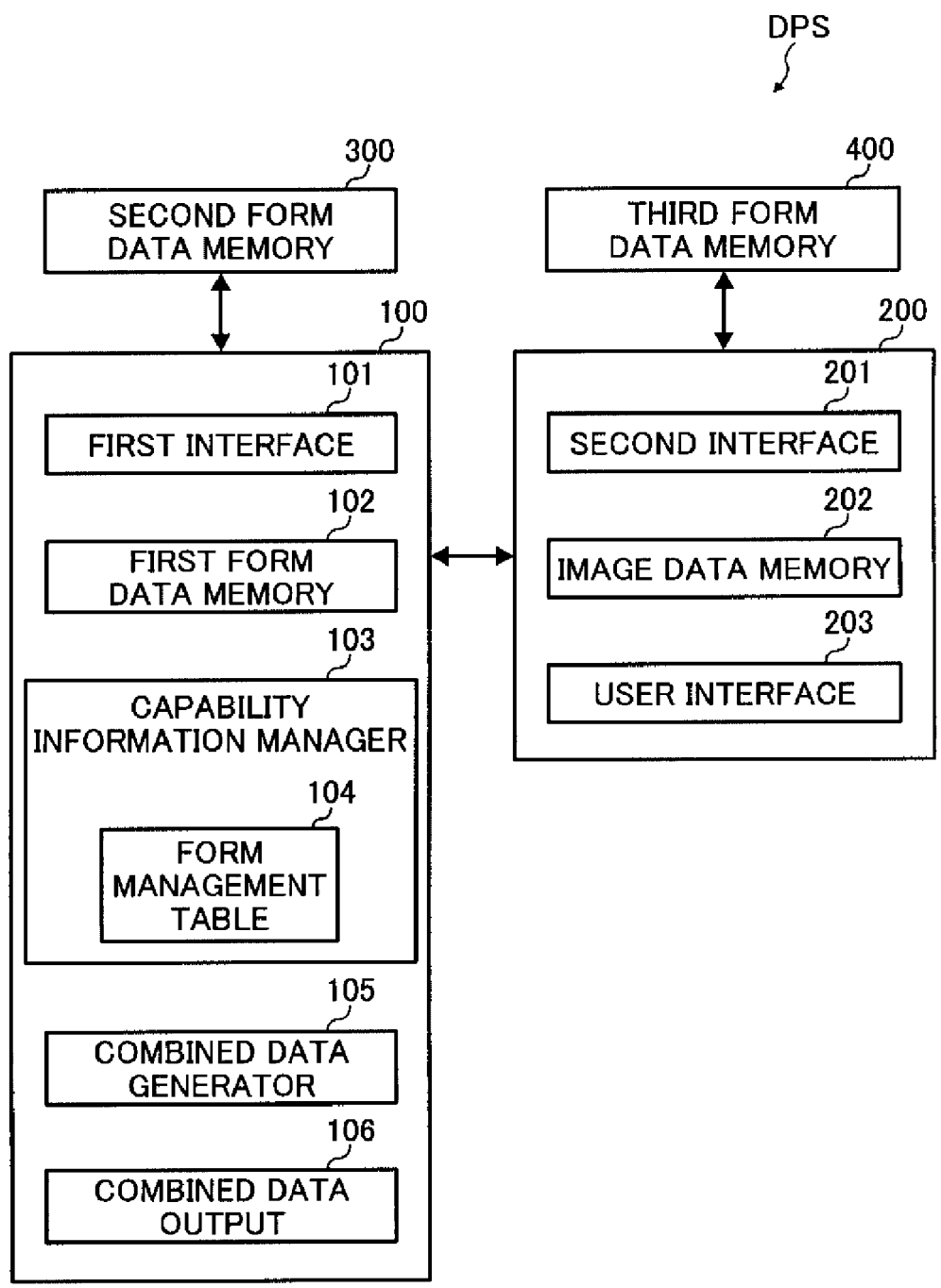
FIG. 17 is a functional structure of the printing system shown in FIG. 1 according to an example embodiment of the present invention.

Referring now to FIG. 17, the functional structure of the printing system DPS shown in FIG. 1 is explained according to an example embodiment of the present invention. The printing system DPS includes an image forming apparatus 100, a portable device 200, a second form data memory 300, and a third form data memory 400. As shown in FIG. 1, the image forming apparatus 100 and the portable device 200 may be directly connected via any desired communication interface. The second form data memory 300 accessible by the image forming apparatus 100 or the third form data memory 400 accessible by the portable device 200 may be implemented by a removable medium.

The image forming apparatus 100 may include a first interface 101, a first form data memory 102, a capability information manager 103 including a form management table 104, a combined data generator 105, and a combined data output 106. The portable device 200 may include a second interface 201, an image data memory 202, and a user interface 203.

The first interface 101 allows the image forming apparatus 100 to communicate with the outside system, such as an external device including the portable device 200 and the second form data memory 300. The first form data memory 102 stores one or more previously stored form data files. The capability information manager 103 manages capability information. For example, the capability information manager 103 manages layout capability information regarding the form data files, for example, by updating layout capability information stored in the form management table 104. The combined data generator 105 combines image data, which may be received from the portable device 200, with a selected one of the form data files to generate combined image data. The combined data output 106 outputs the combined image data. The second interface 201 allows the portable device 200 to communicate with the outside system, such as an external device including the image forming apparatus 100 and the third form data memory 400. The image data memory 302 stores one or more image data files, which may be captured by the portable device 200. The user interface 203 allows the portable device 200 to communicate with a user. The second form data memory 300 and the third form data memory 400 each store one or more additional form data files, which may be stored by the user.

In one example operation, the capability information manager 103 determines whether updating of the form management table 104 is necessary, for example, by accessing information stored in the second form data memory 300. When additional form data is stored in the second form data memory 300, the capability information manager 103 determines that updating is necessary, and updates layout capability information. Further, upon receiving a request for capability information from the portable device 200, the capability information manager 103 sends capability information including the updated layout capability information to the portable device 200. The portable device 200 may display the capability information to the user through the user interface 203.

In another example operation, the portable device 200 receives capability information from the image forming apparatus 100, which includes layout capability information generated from the previously stored form data files stored in the first form data memory 102. The portable device 200 may determine whether updating of the capability information is necessary, for example, by checking the third form data memory 400. When additional form data is stored in the third form data memory 400, the portable device 200 determines that updating is necessary, and updates layout capability information for display to the user.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, the printer PTR shown in FIG. 1 may be replaced by any desired apparatus capable of printing image data, including a copier or a multifunctional apparatus having a plurality of functions of scanning, copying, faxing, printing, and communicating, as illustrated in FIG. 17. The digital camera DSC shown in FIG. 1 may be replaced by any desired apparatus capable of sending image data to the printer PTR, including a digital video camera, a portable phone having the image capturing function, etc., as illustrated in FIG. 17.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. An image forming apparatus configured to connect with a portable device, the image forming apparatus comprising:
   a first form data memory configured to store previously stored first form data, the first form data including data specifying (1) a layout of image data and (2) a layout of additional visual information that is associated with the image data, when the image data is printed on a recording sheet, and wherein the additional visual information includes at least one of character information or line information of one or more rule lines associated with each of respective of one or more images printed based on the image data, and printed on the recording sheet for the each of respective of one or more images printed based on the image data, or logo information;
   a first interface configured to access a second form data memory provided outside of the first form data memory;
   a controller configured to store layout capability information generated using information obtained from the previously stored first form data, determine whether additional second form data is stored in the second form data memory at a predetermined timing, update the layout capability information using information obtained from the additional second form data when the additional second form data is stored in the second form data memory to generate first updated layout capability information, and send capability information including the first updated layout capability information to the portable device in response to a request for capability information received from the portable device, wherein the controller is further configured to determine whether to overwrite one or more of the previously stored first form data with one or more of the additional second form data by checking the second form data memory for the additional second form data having information different from corresponding of the previously stored first form data.

2. The apparatus of claim 1, wherein the second form data memory is provided in a removable medium accessible from the first interface.

3. The apparatus of claim 1, wherein the first updated layout capability information comprises:
   identification information uniquely assigned to each one of the previously stored first form data and the additional second form data; and
   location information indicating a location of the corresponding one of the previously stored first form data and the additional second form data.

4. The apparatus of claim 1, wherein the controller is further configured to analyze a job request received from the portable device, the job request comprising:
   information regarding selected image data to be printed; and
   information regarding selected form data to be used when printing the selected image data, the selected form data being selected from at least one of the previously stored first form data, the additional second form data, and additional third form data,
   and wherein the additional third form data is stored in a third form data memory provided outside of the first form data memory and outside the second form data memory.

5. The apparatus of claim 4, wherein the third form data memory is provided in a removable medium accessible from the portable device.

6. The apparatus of claim 4, wherein the controller is further configured to update the first updated layout capability information using information obtained from the additional third form data or information obtained from the job request, when the additional third form data is selected as the selected additional form data.

7. The apparatus of claim 4, wherein the controller is further configured to combine the selected image data with the selected form data to generate combined image data.

8. The apparatus of claim 7, wherein the selected form data comprises:
   layout information indicating the number of image data files to be included in the combined image data and the order in which the image data files are laid out in the combined image data; and
   depicting information describing a depicting element to be added to the combined image data and the order in which the depicting element is laid out in the combined image data.

9. The apparatus of claim 8, wherein each file of the selected image data is uniquely assigned with an index number, the identification number being used to associate the depicting element and the selected image data.

10. An image forming system, comprising:
    an image forming apparatus and a portable device configured to connect with each other via a communication interface,
    the image forming apparatus comprising:
      a first form data memory configured to store previously stored first form data, the first form data including data specifying (1) a layout of image data and (2) a layout of additional visual information that is associated with the image data, when the image data is printed on a recording sheet, and wherein the additional visual information includes at least one of character information or line information of one or more rule lines associated with each of respective of one or more images printed based on the image data, and printed on the recording sheet for the each of respective of one or more images printed based on the image data, or logo information;
      a first interface configured to access a second form data memory provided outside of the first form data memory; and
      a first controller configured to store layout capability information generated using information obtained from the previously stored first form data, determine whether additional second form data is stored in the second form data memory at a predetermined timing, update the layout capability information using information obtained from the additional second form data when the additional second form data is stored in the second form data memory to generate first updated layout capability information, and send capability information including the first updated layout capability information to the portable device in response to a request for capability information received from the portable device,
    wherein the controller is further configured to determine whether to overwrite one or more of the previously stored first form data with one or more of the additional second form data by checking the second form data memory for additional second form data having information different from corresponding of the previously stored first form data.

11. The system of claim 10, wherein the portable device comprises:
    a user interface configured to display the first updated layout capability information to a user.

12. The system of claim 10, wherein the portable device further comprises:
    a second interface configured to access a third form data memory provided outside of the first form data memory and outside the second form data memory; and
    a second controller configured to determine whether additional third form data is stored in the third form data memory, update the first updated layout capability information using information obtained from the additional third form data when the additional third form data is stored in the third form data memory to generate second updated layout capability information; and
    a user interface configured to display the second updated layout capability information to a user.

13. The system of claim 12, wherein the portable device further comprises:
    an image data memory configured to store image data, and wherein the second controller of the portable device is further configured to generate a job request, the job request comprising:
      information regarding selected image data to be printed, the selected image data being selected from the image data stored in the image data memory; and
      information regarding selected form data to be used when printing the selected image data, the selected form data being selected from at least one of the previously stored first form data, the additional second form data, and the additional third form data.

14. The system of claim 13, wherein the second controller of the portable device is further configured to send the selected form data together with the job request to the image forming apparatus, when the additional third form data stored in the third form data memory is selected as the selected form data.

15. The system of claim 13, wherein the first controller of the image forming apparatus is further configured to update the first updated layout capability information using information obtained from the job request, when the additional third form data stored in the third form data memory is selected as the selected form data.

16. The system of claim 13, wherein the first controller of the image forming apparatus is further configured to combine the selected image data with the selected form data to generate combined image data.

17. A portable device configured to connect with an image forming apparatus, the portable device comprising:
   an image data memory configured to store image data;
   a first interface configured to access a second form data memory provided outside of a first form data memory provided in the image forming apparatus;
   a controller configured to store layout capability information generated using information obtained from previously stored first form data stored in the first form data memory of the image forming apparatus, the first form data including data specifying (1) a layout of image data and (2) a layout of additional visual information that is associated with the image data, when the image data is printed on a recording sheet, and wherein the additional visual information includes at least one of character information or line information of one or more rule lines associated with each of respective of one or more images printed based on the image data, and printed on the recording sheet for the each of respective of one or more images printed based on the image data, or logo information, to determine whether additional second form data is stored in the second form data memory at a predetermined timing, update the layout capability information using information obtained from the second additional form data when the additional second form data is stored in the second form data memory to generate first updated layout capability information,
   wherein the controller is further configured to determine whether to overwrite one or more of the previously stored first form data with one or more of the additional second form data by checking the second form data memory for additional second form data having information different from corresponding of the previously stored first form data; and
   a user interface configured to display the first updated layout capability information to a user.

18. The device of claim 17, wherein the second form data memory is provided in a removable medium accessible from the first interface.

19. The device of claim 17, wherein the first updated layout capability information comprises:
   identification information uniquely assigned to each one of the previously stored first form data and the additional second form data; and
   location information indicating a location of the corresponding one of the previously stored first form data and the additional second form data.

20. The device of claim 17, further comprising:
   an image capturing unit configured to capture the image data.

* * * * *